(12) United States Patent
Haller

(10) Patent No.: US 6,582,032 B2
(45) Date of Patent: Jun. 24, 2003

(54) COIL ASSEMBLY INTEGRATED ELECTRONIC DRIVE AND METHOD THEREOF

(75) Inventor: Mark D. Haller, Canton, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/897,667

(22) Filed: Jul. 2, 2001

(65) Prior Publication Data

US 2003/0001432 A1 Jan. 2, 2003

(51) Int. Cl.[7] ................................................. B60T 8/34
(52) U.S. Cl. ................................. 303/119.2; 303/119.3
(58) Field of Search ........................... 303/119.2, 119.3; 251/129.15

(56) References Cited

U.S. PATENT DOCUMENTS

| | | |
|---|---|---|
| 5,137,455 A | 8/1992 | Moerbe et al. |
| 5,685,617 A | 11/1997 | Hio et al. |
| 5,695,259 A | 12/1997 | Isshiki et al. |
| 5,957,547 A * | 9/1999 | Schliebe et al. ......... 303/119.3 |
| 6,059,381 A | 5/2000 | Bayer |
| 6,120,114 A * | 9/2000 | Blazic et al. ............ 303/119.2 |

* cited by examiner

Primary Examiner—Christopher P. Schwartz
(74) Attorney, Agent, or Firm—Tarolli, Sundheim, Covell, & Tummino L.L.P.

(57) ABSTRACT

An assembly (20) is used with an anti-lock braking system (10). The assembly (20) includes electronic circuitry (30) for the anti-lock braking system (10), a plurality of solenoid coil devices (70) for the anti-lock braking system (10), and a serial drive component (101). The serial drive component (101) electrically interconnects the electronic circuitry (30) and the plurality of solenoid coil devices (70). The serial drive component (101) takes input from a first number of interconnection points of the plurality of solenoid coil devices (70) and providing output to a second number of interconnection points of the electronic circuitry (30). The first number is greater than the second number.

18 Claims, 2 Drawing Sheets

COIL ASSEMBLY INTEGRATED ELECTRONIC DRIVE AND METHOD THEREOF

FIELD OF THE INVENTION

The present invention relates to an automotive anti-lock braking system and, more particularly, to an integrated electronic drive for use with the automotive anti-lock braking system.

BACKGROUND OF THE INVENTION

A conventional anti-lock braking system integrates an electronic control assembly with the braking system's motor connector and main hydraulic control connector. The conventional main hydraulic control connector includes a solenoid coil assembly press-fit onto valve stems of a hydromechanical block. This assembly is, in turn, interconnected to a main circuit board via a lead frame. The motor connector is also connected to the main circuit board.

The main connector may be interconnected to the main circuit board through a bore in the hydromechanical block in order that the circuit board not be heated by the solenoid coil assembly of the main connector. An electronic control assembly that facilitates assembly while meeting all of the requirements of a conventional anti-lock braking system would beneficially reduce assembly time and efficiency for the anti-lock braking system.

SUMMARY OF THE INVENTION

In accordance with one feature of the present invention, an assembly is used with an anti-lock braking system. The assembly includes electronic circuitry for the anti-lock braking system, a plurality of solenoid coil devices for the anti-lock braking system, and a serial drive component. The serial drive component electrically interconnects the electronic circuitry and the plurality of solenoid coil devices. The serial drive component takes input from a first number of interconnection points of the plurality of solenoid coil devices and provides output to a second number of interconnection points of the electronic circuitry. The first number is greater than the second number.

In accordance with another feature of the present invention, an assembly is used with an anti-lock braking system. The assembly includes electronic circuitry for the anti-lock braking system, a plurality of solenoid coil devices for the anti-lock braking system, and a component. The component exchanges a plurality of signals between a plurality of first connections to the plurality of solenoid coil devices and a single second connection to the electronic circuitry.

In accordance with still another feature of the present invention, an assembly is used with an anti-lock braking system. The assembly includes circuit means for the anti-lock braking system, a plurality of coil means for the anti-lock braking system, and a means for electrically interconnecting the circuit means and the plurality of coil means. The interconnecting means takes input from a first number of interconnection points of the circuit means and provides output to a second number of interconnection points of the plurality of coil means. The first number is less than the second number.

In accordance with yet another feature of the present invention, a method is used to electrically control an anti-lock braking system. The method includes the following steps: providing electronic circuitry for the anti-lock braking system and a plurality of solenoid coil devices for the anti-lock braking system; and exchanging a plurality of signals between a plurality of first connections to the plurality of solenoid coil devices and a single second connection to the electronic circuitry.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXAMPLE EMBODIMENT

Figure 1:
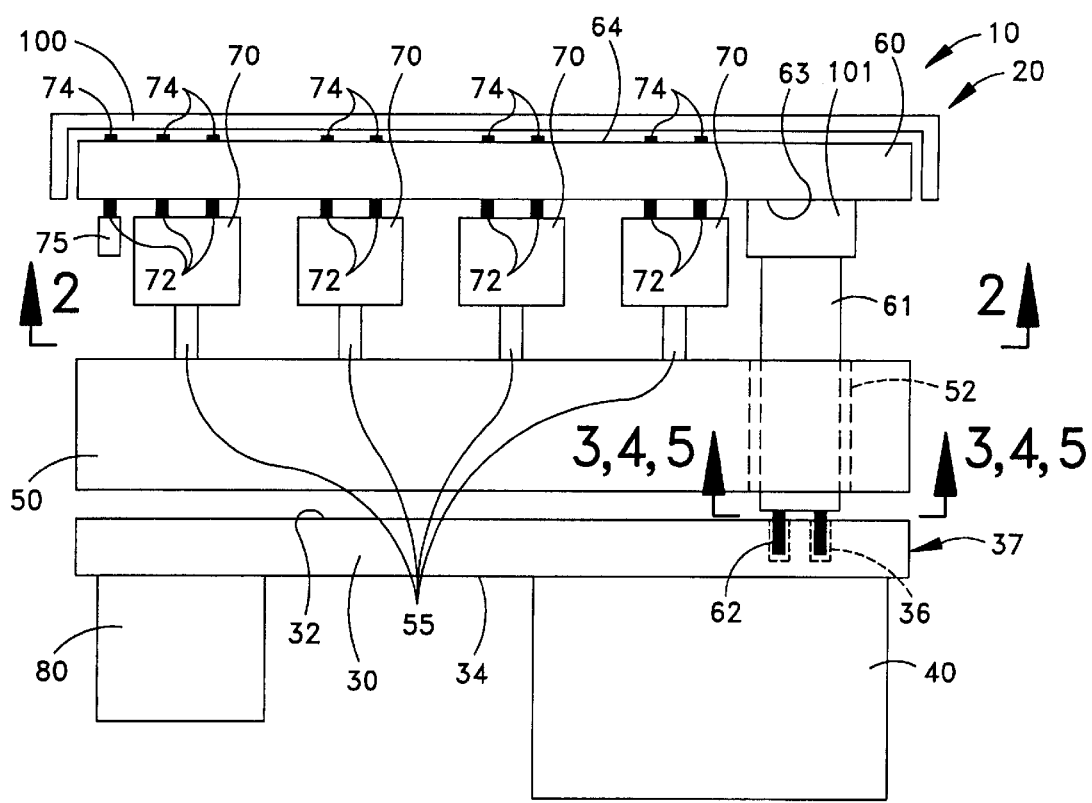
FIG. 1 is a schematic view of an assembly in accordance with the present invention.
Figure 2:
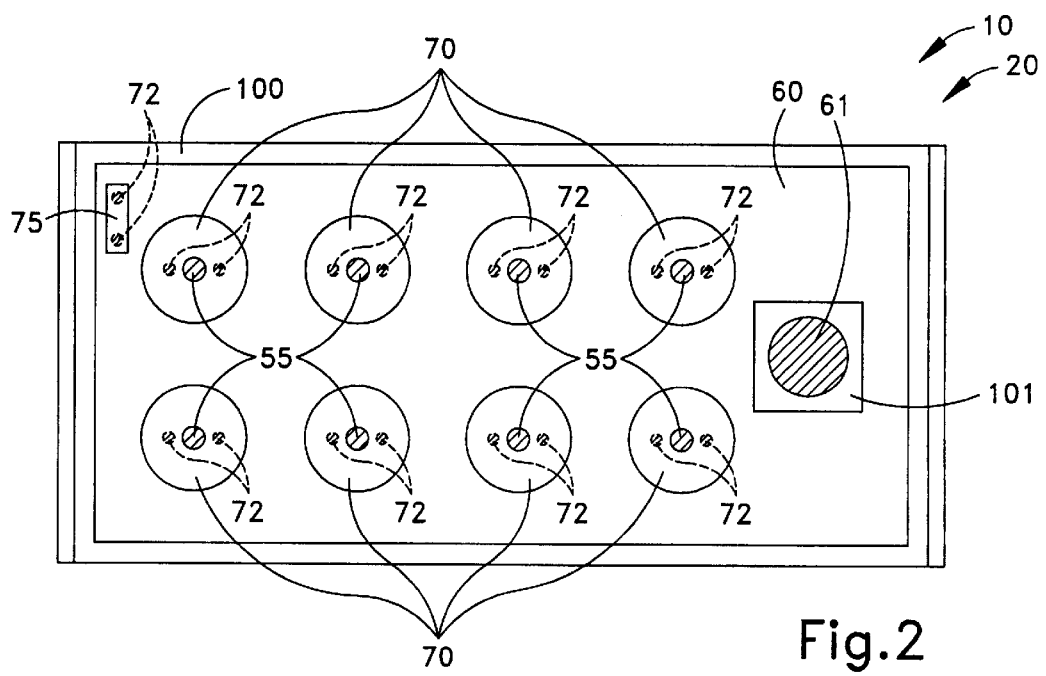
FIG. 2 is a schematic section view taken along line 2—2 in FIG. 1.

In accordance with one embodiment of the present invention, as viewed in FIGS. 1 and 2, an anti-lock braking system 10 includes an integrated electronic assembly 20. The assembly 20 comprises electronic circuitry typically in the form of a printed circuit board 30, a motor 40 for driving a pump for the anti-lock braking system 10, a hydromechanical block 50 for controlling flow of pressurized fluid provided by the pump, a lead frame 60, a plurality of devices typically in the form of solenoid coils 70 (FIG. 2, eight shown), one or more pressure sensor interfaces 75, and a component 80. The component 80 may be any known electrical component for the anti-lock braking system 10.

The circuit board 30 has a planar first surface 32 and a planar second surface 34 opposite the first surface. The hydromechanical block 50 is located between the circuit board 30 on one side and the lead frame 60 and plurality of solenoid coils 70 on the other side of the hydromechanical block. The hydromechanical block 50 has a through bore 52 for providing direct access from the circuit board 30 to the lead frame 60.

The lead frame 60 has a planar first surface 63 and a planar second surface 64 opposite the first surface of the lead frame. Each of the plurality of solenoid coils 70 and the pressure sensor interface(s) 75 typically has two connectors 72, such as solderable connectors. The solderable connectors 72 are typically inserted completely through corresponding holes in the lead frame 60 and secured to the lead frame by solder 74 on the second surface 64 of the lead frame, as is known in the art.

The lead frame 60 has a serial drive component 101 for electrically interconnecting the plurality of solenoid coils 70 and the circuit board 30. The serial drive component 101 exchanges input/output data between a pair of first connection points (i.e., the connectors 72) corresponding to each solenoid coil 70/pressure sensor interface 75 and at least two second connection points of the circuit board 30.

The serial drive component 101 encodes/decodes communication/control data between the solenoid coils/ pressure sensor interface(s) 70, 75 and the circuit board 30.

The serial drive component 101 thereby allows the number of second connection points between the lead frame 60 and the circuit board 30 to be reduced from a one-to-one relationship with the number of first connection points between the plurality of solenoid coils 70 and the lead frame.

The serial drive component 101 may be a microcontroller or an ASIC, for taking commands from the circuit board 30 and performing fault detection functions. The serial communication allows this fault detection with fewer interconnects and greater speed than a one-to-one correspondence in connections.

Figure 3:
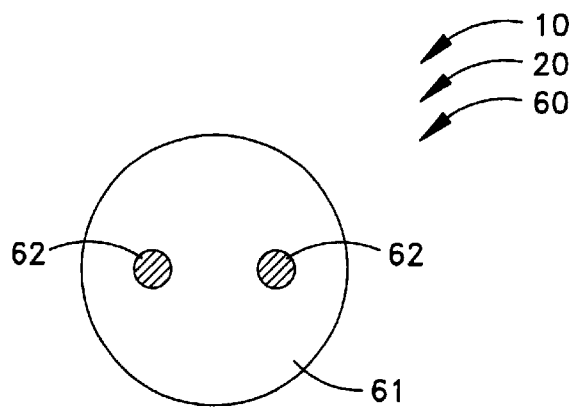
FIG. 3 is a schematic section view taken along line 3—3 in FIG. 1.
Figure 4:
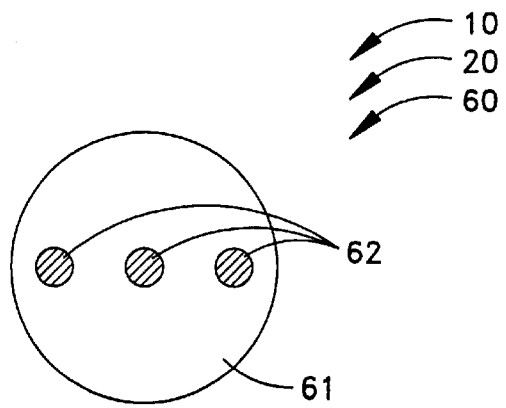
FIG. 4 is a schematic section view taken along line 4—4 in FIG. 1.
Figure 5:
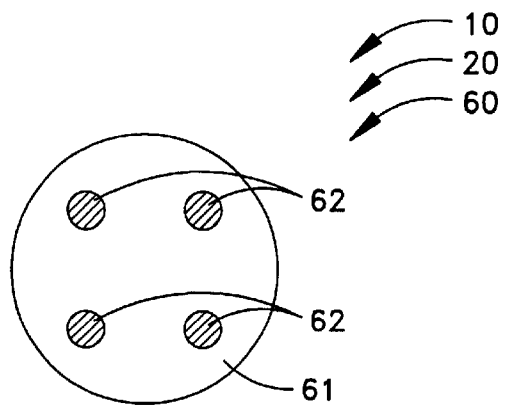
FIG. 5 is a schematic section view taken along line 5—5 in FIG. 1.

The lead frame 60 further has a main connector 61 extending from the serial component 101 through the through bore 52 of the hydromechanical block 50 to the first surface 34 of the circuit board 30. The connector 61 preferably has a set of mechanical one-way connectors 62, such as non-soldered compliant pins, extending from a distal end of the connector of the lead frame 60. The set of connectors 62 engages a corresponding set of apertures, or engagement holes 36, in the first surface 32 of the circuit board 30. The engagement holes 36 are located adjacent an edge 37 of the first surface 32 of the circuit board 30. The connector 61 may be cylindrical (FIGS. 1 and 2) or any other suitable shape. Due to the serial drive component 101, the connector 61 typically has two (FIG. 3), three (FIG. 4), or four (FIG. 5) connectors 62 (i.e., the second connection points described above) for connecting to the circuit board 30. The connector 61 transmits serial signals provided by the serial drive component 101.

As viewed in FIG. 1, the use of the non-soldered connectors 62 allows the lead frame 60 to be easily mounted on the circuit board 30 subsequent to the mounting of the plurality of solenoid coils 70 to the lead frame while also conserving space on the first surface 32 of the circuit board. Alternatively, the connectors 62 may be solderable pins, as is known in the art.

The serial component 101 allows the connectors 62 of the lead frame 60 to be reduced from a one-to-one relationship to a total number of connectors 62 of as few as two (FIG. 3) for transferring control information between the solenoid coils/pressure sensor interface(s) 70, 75 and the circuit board 30, as described above. The circuit board 30 thereby provides means for electrical communication and control and mechanical support to the lead frame 60, the plurality of solenoid coils 70, and the pressure sensor interface(s) 75. Since the mechanical one-way connectors 62 of the connector 61 plastically deform when inserted into the engagement holes 36 of the circuit board 30, no access to the second surface 34 of the circuit board is necessary for mounting the lead frame to the circuit board. This arrangement may allow the circuit board 30 to be up to half the size of a circuit board utilizing the conventional arrangement (i.e., the solenoid coils or a lead frame mounted directly adjacent and opposite the circuit board).

The plurality of solenoid coils 70 are mechanically secured to valves 55 on the hydromechanical block 50, as is known in the art. The plurality of solenoid coils 70 controls actuation and operation of the valves 55 of the hydromechanical block 50. The valves 55 control flow of the pressurized fluid provided by the motor 40 and the pump. A cover, or lid 100, may be provided for the assembly 20 in order to protect the elements of the assembly from environmental conditions.

As viewed in FIGS. 1 and 2, the connection of the connector 61 of lead frame 60 adjacent an edge 37 of the first surface 32 of the circuit board 30 allows greater access to the other components than the conventional arrangement. The component 80 typically has a set of connectors, such as solderable connectors or non-soldered compliant pins (not shown). Other components (not shown) of the anti-lock braking system 10 may be mounted to the second surface 34 of the circuit board 30 in order to further conserve space and reduce the overall size of the circuit board and the entire anti-lock braking system.

In accordance with one feature of the present invention, the assembly includes the electronic circuitry 30, the solenoid coil devices 70, and the serial drive component 101. The serial drive component 101 electrically interconnects the electronic circuitry 30 and the solenoid coil devices 70.

The serial drive component 101 takes input from the first number of first connection points of the solenoid coil devices/pressure sensor interface(s) 70, 75 (two each) and provides output to a second number of second connection points of the electronic circuitry 30 (two, three, or four). Alternatively, the serial drive component 101 takes input from the second number of second connection points of the electronic circuitry 30 (two, three, or four) and provides output to the first number of first connection points of the solenoid coil devices/pressure sensor interface(s) 70, 75 (two each). The first number is thus greater than the second number.

In accordance with another feature of the present invention, the assembly includes the electronic circuitry 30, the solenoid coil devices 70, and the component 101. The component 101 exchanges a plurality of signals between the first connections 72 to the solenoid coil devices 70 (two each) and one of the second connections to the electronic circuitry 30 (one of the two, three, or four connectors 62).

In accordance with still another feature of the present invention, the assembly includes circuit means, coil means, and the means for electrically interconnecting the circuit means and the coil means. The interconnecting means takes input from the first number of first connection points of the coil means and provides output to the second number of second connection points of the circuit means. Alternatively, the interconnecting means takes input from the second number of second connection points of the circuit means and provides output to the first number of first connection points of the coil means. The first number is thus greater than the second number.

The circuit means may be the circuit board 30 described above, a wiring harness, or other type of electrical routing arrangement. The coil means may be the solenoid coil(s) 70 described above or other electrical actuating device(s) for operating the hydraulic valves 55 of the anti-lock braking system 10. The interconnecting means may be the serial drive component 101 described above or other type of adapter for reducing electrical communication points while maintaining full communication and control therethrough.

In accordance with yet another feature of the present invention, a method is used to electrically control the anti-lock braking system 10. The method includes the following steps: providing the electronic circuitry 30 and the solenoid coil devices 70; and exchanging a plurality of signals between the first connections 72 of the solenoid coil devices 70 and one of the second connections 62 of the electronic circuitry 30.

From the above description of the invention, those skilled in the art will perceive improvements, changes and modifications. Such improvements, changes and modifications within the skill of the art are intended to be covered by the appended claims.

Having described the invention, the following is claimed:

1. An assembly for an anti-lock braking system, said assembly comprising:

electronic circuitry for the anti-lock braking system;

a plurality of solenoid coil devices for the anti-lock braking system; and a serial drive component for serially transferring signals from said electronic circuitry to said plurality of solenoid coils, said serial drive component taking input from a first number of interconnection points of said electronic circuitry and providing output to a second number of interconnection points of said plurality of solenoid coils, said first number being less than said second number.

2. The assembly as set forth in claim 1 further including a motor for providing pressurized fluid to the anti-lock braking system, said motor being controlled by said electronic circuitry.

3. The assembly as set forth in claim 1 further including a hydromechanical block for controlling pressurized fluid of the anti-lock braking system.

4. The assembly as set forth in claim 3 further including a lead frame interconnecting said plurality of solenoid coils and said serial drive component.

5. The assembly as set froth in claim 4 wherein said lead frame has a main connector extending from said serial drive component through a through bore in said hydromechanical block to said electronic circuitry.

6. The assembly as set forth in claim 1 wherein said solenoid coil devices are mechanically connected to a corresponding plurality of valves for the anti-lock braking system.

7. An assembly for an anti-lock braking system, said assembly comprising:

electronic circuitry for the anti-lock braking system;

a plurality of solenoid coil devices for the anti-lock braking system; and a serial drive component for exchanging a plurality of signals between a plurality of first connections to said plurality of solenoid coil devices and a single second connection to said electronic circuitry.

8. The assembly as set forth in claim 7 further including a motor for providing pressurized fluid to the anti-lock braking system, said motor being controlled by said electronic circuitry.

9. The assembly as set forth in claim 8 further including a hydromechanical block for controlling pressurized fluid of the anti-lock braking system.

10. The assembly as set forth in claim 9 further including a lead frame interconnecting said plurality of solenoid coil devices and said electronic circuitry.

11. The assembly as set froth in claim 10 wherein said lead frame has a main connector extending from said serial drive component through a through bore in said hydromechanical block to said electronic circuitry.

12. The assembly as set forth in claim 11 wherein said solenoid coil devices are mechanically connected to a corresponding plurality of valves within said hydromechanical block.

13. The assembly as set forth in claim 12 further including a plurality of connector pins for interconnecting said main connector of said lead frame to said electronic circuitry, one of said connector pins comprising said single second connection to said electronic circuitry.

14. The assembly as set forth in claim 13 wherein said connector pins are mechanical one-way connectors.

15. The assembly as set forth in claim 13 wherein said connector pins are compliant pins.

16. The assembly as set forth in claim 13 wherein said hydromechanical block is located between said component and said electronic circuitry.

17. The assembly as set forth in claim 16 wherein said electronic circuitry is located between said motor and said hydromechanical block.

18. An assembly for an anti-lock braking system, said assembly comprising:

circuit means for the anti-lock braking system;

a plurality of circuit elements for the anti-lock braking system; and a means for electrically interconnecting said circuit means and said plurality of circuit elements, said interconnecting means including communication means for transferring a plurality of signals between a first number of connection points of said circuit means and a second number of connection points of said plurality of circuit elements, said first number being less than said second number, each of said plurality of signals corresponding to an associated one of said plurality of circuit elements.

\* \* \* \* \*